Aug. 9, 1966　　　　　J. E. COORDES　　　　　3,265,147
AUXILIARY WHEEL DRIVE MECHANISM
Filed Feb. 18, 1965　　　　　　　　　　　　　2 Sheets-Sheet 1

INVENTOR
JOHN E. COORDES

BY H. M. Saragovitz,
E. J. Kelly,
H. Berl,
E. P. Barthel
ATTORNEYS

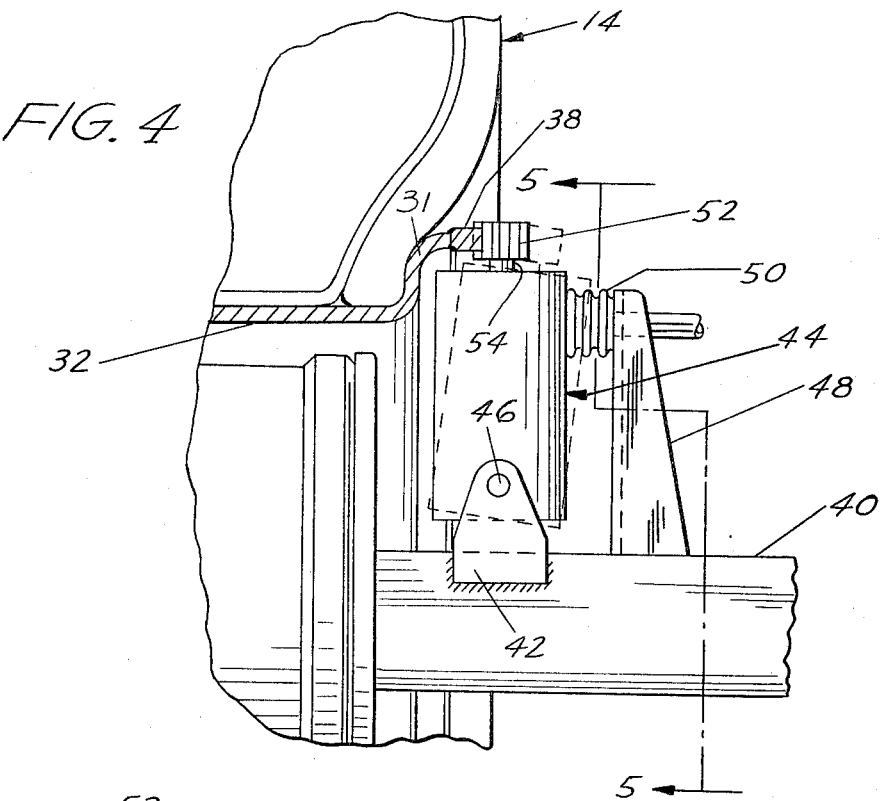
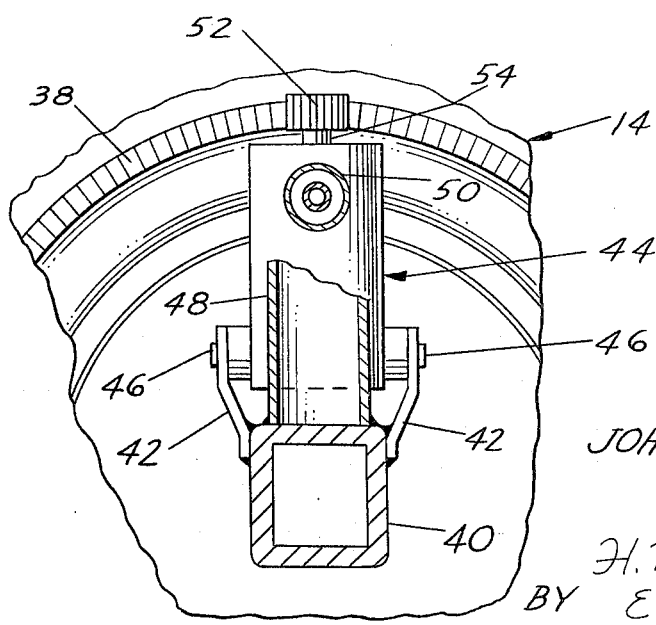

United States Patent Office 3,265,147
Patented August 9, 1966

3,265,147
AUXILIARY WHEEL DRIVE MECHANISM
John E. Coordes, Birmingham, Mich., assignor to the United States of America as represented by the Secretary of the Army
Filed Feb. 18, 1965, Ser. No. 433,819
4 Claims. (Cl. 180—44)

The invention described herein may be manufactured and used by or for the Government of the United States of America for governmental purposes without the payment of any royalties thereon or therefor.

The present invention relates to a wheel drive mechanism for vehicles and more particularly to a wheel drive mechanism whereby the necessary parts can be supplied by means of a repair kit adapted to provide any vehicle or trailer, particularly of the non-driven type, with the capability of all wheel drive.

Additional power is often required to operate heavy duty automotive vehicles during off-highway travel, loss of engine power or other situations resulting in the vehicle being stalled. In the case of highway operation, it becomes important to propel disabled vehicles quickly out of the line of traffic without the need of a separate tow vehicle.

It is an object of the present invention to provide a drive system to propel an existing vehicle with a minimum of alteration to the vehicle.

Another object is to provide a wheel drive mechanism or wheel-kicker that will not interfere with the normal wheel design or maintenance operations such as the changing of tires.

A further object of the invention is the provision of a motive system to propel a stalled vehicle utilizing an auxiliary power source that is readily available on most heavy vehicles, i.e. electrical, hydraulic or pneumatic.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 4 is a fragmentary front elevation, partly in section, of an alternate form of the invention.

FIG. 5 is a view, partly in section, on line 5—5 of FIG. 4.

Figure 1:
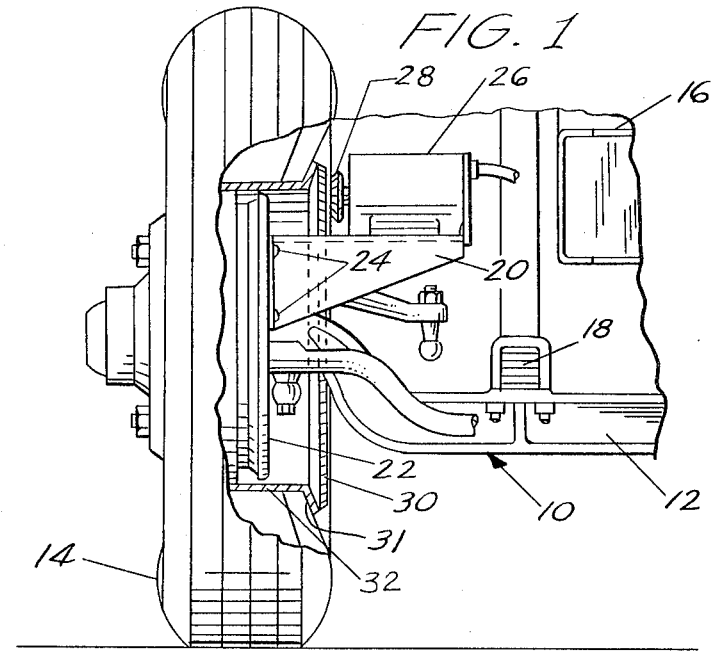
FIG. 1 is a fragmentary front elevation, partly in section, illustrating the construction of one form of the invention.

Considering now the drawings in detail, there is shown in FIG. 1 a portion of a conventional chassis indicated generally at 10 and includes a front axle assembly 12 having a disk type wheel 14 secured at one end thereof. The chassis also has a frame partially shown at 16 and a laminated leaf spring 18 supported on the front axle.

According to the embodiment of the invention shown in FIG. 1 a mounting bracket 20 is secured to the brake backup plate 22 by means of bolts 24. Motive means or torque source 26, mounted on bracket 20, has a pinion drive gear 28 mounted directly on the drive shaft of the motor 26. Beveled ring gear 30 is brazed or welded to the integral flange 31 on the inboard side of the wheel rim 32 in such a manner that it will not interfere with the normal wheel design or maintenance such as tire change. This is achieved by having the ring gear attached to the flange 31 so that the entire gear is spaced radially outward from the inner surface of the rim. As shown in FIG. 1, the pinion gear 28 is out of mesh and entirely away from the ring gear 30 during normal operation of the vehicle. It will be noted that the rim 32 is shown as being of the generally flat-base military rim employed on heavy trucks. This type rim has a demountable side flange (not shown).

The motor 26 when actuated causes lengthwise travel of the pinion gear 28 until it meets or engages with the ring gear 30. When the pinion gear is fully engaged with the ring gear, the pinion is then driven by the high torque motor and applies a force on the wheel at a point of appreciable advantage. If the prime mover of the vehicle is in operation, the power delivered to the motor 26 can be turned off as soon as the vehicle is under motion. In cases where the prime mover has failed, the invention can be used to propel the dead vehicle to a more desirable location.

The motive means for the wheel-kicker device include a motor, which may be electric, pneumatic or hydraulic. It is to be understood that the present invention is not limited to any specific type of torque source, and the illustration shown is intended for descriptive purposes only and in no way is to be construed as limiting. The electric motive means illustrated in FIG. 1 can be of the electric starter type, as for example, the "Bendix" drive starting mechanism used on many cars, requiring a low-voltage direct-current motor capable of developing high torque which is supplied with current from the battery (not shown).

Figures 2, 3:
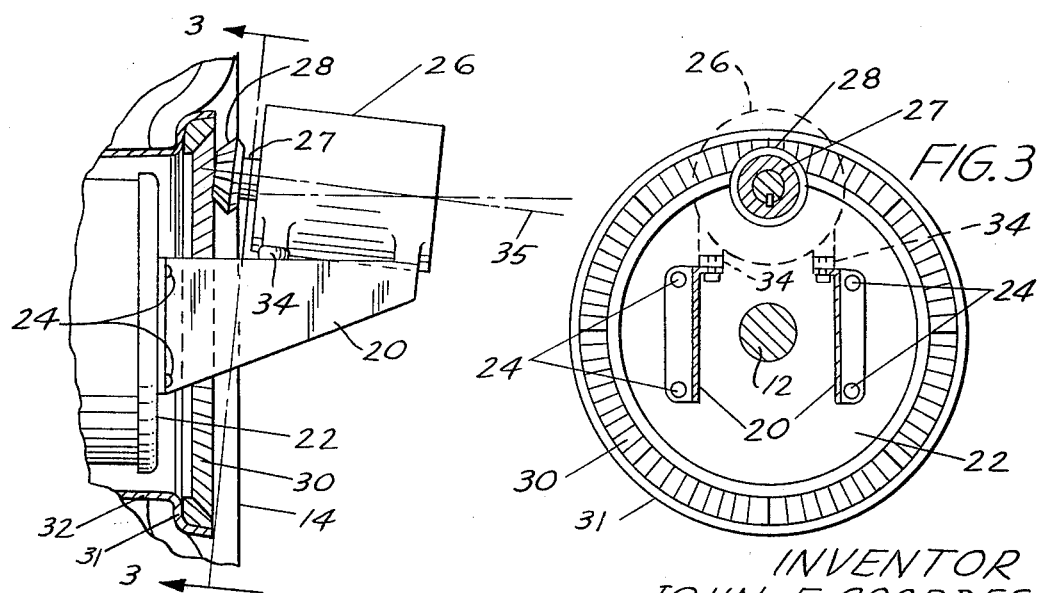
FIG. 2 is a fragmentary front elevation, partly in section, illustrating a slightly modified form of the invention.
FIG. 3 is a side elevation section on line 3—3 of FIG. 2.

FIGS. 2 and 3 show an alternative wheel-kicker design to overcome wheel eccentricities and differs from the structure of FIG. 1 only in the alignment of the drive motor 26. This is accomplished by mounting the pinion end of the motor so that the center line 35 of the motor armature drive shaft 27 is on an acute angle with the horizontal in the range of five to 10 degrees to insure engagement of the pinion drive gear 28 with the ring gear 30. Preferably, the motor is cushioned relative to the bracket 20 by suitable rubber biscuits 34, or like cushioning means which resiliently support the motor in position but allow it to float in cushioned relationship to the bracket. Such an arrangement will permit good engagement of the gears 28 and 30 even in cases where the wheel is out-of-round or warped.

It is intended that the pinion and ring gears be constructed with a course pitch and with generous clearance to enable the forcing out of dirt collected. To further insure longer life of the gears the drive pinion can be designed with an ellipsoidal tooth shape. The result of this unique arrangement is that even though exposed the gears are self-cleaning and require no lubrication. The drive pinion 28 can be made of softer material than the driven ring gear if it is desired to make the pinion the replaceable part of the system.

The embodiment of FIGS. 4 and 5 features the wheel-kicker wherein even more mechanical advantage can be attained while also allowing for a variation in design. The wheel 14 has a flange 31 integral with a rim 32 with a circular gear 38 brazed or welded to the wheel flange in such a manner that the gear teeth face outwardly from the wheel in a plane normal to the wheel axle.

Axle member 40 has welded thereto brackets 42 which pivotally support motor 44 by means of pins 46. A support stand 48 is positioned on the axle 40 in order to allow the pneumatic bellows type actuator 50, to pivot the motor 44 from an engaged position represented by solid lines in FIG. 4 to a disengaged position represented by dashed lines.

The pneumatic, vane-type motor 44 is internally geared to produce high output torque at low speed. Pinion gear 52, mounted directly on the drive shaft 54 of the motor 44 mates automatically with the circular gear 38 upon energizing the system. Both the pinion gear and the ring gear are shown as being of the straight spur-tooth type with generous mesh clearance. As in the case with the gear arrangement shown in FIGS. 1–3, the gears 38 and 52 are essentially self-cleaning.

All of the above described embodiments of the wheel drive mechanism of the invention are designed to be used with a power source already on the vehicle to be fitted. For example, on a light vehicle starting type motors and solenoid actuators would be used in conjunction with the existing electrical system. With a vehicle having a hydraulic system, such as many tractors employ to operate accessories, hydraulic motors and actuators would be employed along with an accumulator. Most trucks have an inherent air system and here pneumatic motors and actuators would be used along with its own air storage tank so as not to deplete the vehicle brake air supply. All of the above systems will apply power to the fitted wheel to move the vehicle a short distance even with the main engine dead. The distance the vehicle will be moved will depend on how long the power source will last, i.e. dependent on the charge in the battery if electric, accumulator volume and pressure if hydraulic, or, the volume and pressure of the air in the storage tank if pneumatic.

Obviously, many modifications and variations of the present invention are possible in the light of the above teachings. It is therefore to be understood that within the scope of the appended claims, the invention may be practiced otherwise than as specifically described.

I claim:

1. In an auxiliary vehicle drive system assembly for use on all wheels of a vehicle, the combination comprising:

axle means on said vehicle;

a plurality of wheels mounted on said axle means;

said wheels including rims having flanges thereon, wherein the flanges are on the inner portion of said rims facing outwardly from the wheels in a plane normal to the axle;

circular gears on said flanges;

auxiliary drive means having pinion gears thereon pivotally mounted on said axle a distance from, and in the same plane as, said circular gears;

actuator means connected to said axle and said auxiliary drive means, whereby upon activation of said actuator means, the auxiliary drive means are pivoted toward the wheels of the vehicle, wherein the pinion gears and said circular gears engage to drive the vehicle.

2. The combination as set forth in claim 1, wherein said circular gears are formed at the ends of said flanges, and face outwardly away from said wheels in a plane normal to said axle.

3. The combination as set forth in claim 1, wherein the actuator means is a pneumatic bellows.

4. The combination as set forth in claim 1, wherein said auxiliary drive means is a pneumatic vane-type motor producing high output torque at low speed.

References Cited by the Examiner

UNITED STATES PATENTS

| | | | |
|---|---|---|---|
| 627,133 | 6/1899 | McDougall | 180—65 X |
| 810,881 | 1/1906 | Pfouts | 180—44 |
| 864,623 | 8/1907 | Douglas | 180—43 |
| 1,593,194 | 7/1926 | Scott. | |
| 2,798,565 | 7/1957 | Rosenthal et al. | 180—65 X |
| 3,161,248 | 12/1964 | Edwards | 180—10 |
| 3,186,506 | 6/1965 | Leach et al. | 180—44 X |

A. HARRY LEVY, *Primary Examiner.*